UNITED STATES PATENT OFFICE.

CHARLES H. MacDOWELL, OF CHICAGO, ILLINOIS, AND HERBERT H. MEYERS AND WARREN B. PATTISON, OF PITTSBURGH, PENNSYLVANIA, ASSIGNORS TO ARMOUR FERTILIZER WORKS, OF CHICAGO, ILLINOIS, A CORPORATION OF NEW JERSEY.

OXIDATION OF AMMONIA.

1,420,201.   Specification of Letters Patent.   Patented June 20, 1922.

No Drawing.   Application filed December 3, 1918.   Serial No. 265,180.

*To all whom it may concern:*

Be it known that we, CHARLES H. MAC-DOWELL, residing in Chicago, Cook County, Illinois, HERBERT H. MEYERS and WARREN B. PATTISON, residing in Pittsburgh, Allegheny County, Pennsylvania, have invented certain new and useful Improvements in the Oxidation of Ammonia; and we do hereby declare the following to be a full, clear, and exact description of the invention, such as will enable others skilled in the art to which it appertains to make and use the same.

In the oxidation of ammonia to oxides of nitrogen it has been the commercial practice to make use of platinum as a catalyst, the platinum being commonly employed in the form of wire gauze or net. Attempts to replace platinum by other catalysts have not, in so far as we are aware, been commercially successful, and platinum has accordingly been used almost exclusively as the catalyst in the conversion of ammonia to oxides of nitrogen.

We have now found that results comparable to those obtainable with platinum can be attained by subjecting a mixture of the ammonia and of the oxidizing gas to the action of vanadium oxide or oxides under proper working conditions, and the present invention relates to the improved catalytic process in which the vanadium oxides are employed.

The catalyst according to this invention is a composite one, that is to say, it is composed of two substances, each of which contributes to the oxidizing reaction. As a body for the catalyst there is used the highly porous alumina obtained by the calcination of alunite. As the main catalytic agent there is used vanadium oxide which is diffused through or impregnates the alumina. Both the alumina and the vanadium oxide contribute to the catalyzing effect, the vanadium oxide probably in the greater degree. Thus, for example, a satisfactory catalyst can be prepared by mixing 10 parts of ammonium vanadate very intimately with 100 parts of alumina obtained by the calcination and extraction of alunite, the mixture being moistened just enough to permit of molding and then briquetted into the desired shape. These briquettes are first air dried, and may then be introduced into the catalytic chamber and brought to the proper temperature to decompose the ammonium vanadate.

The alumina of alunite is well adapted for use as the carrier for the vanadium oxide, inasmuch as it is obtainable as a result of the calcination of alunite, and the leaching of the calcined product, in the form of an exceedingly porous material which can be readily mixed with the vanadium compound, and then molded into the desired shape.

In the carrying out of the catalytic process of the present invention the composite vanadium oxide catalyst is introduced into the catalytic chamber and is there heated to the proper temperature for the catalytic reaction. If briquettes are made of ammonium vanadate and the carrier, they may be first brought to a proper temperature for decomposition of the ammonium vanadate before the reaction gases are brought into the reaction chamber. The decomposition of the ammonium vanadate may, however, be combined with the subsequent catalytic process instead of being carried out as a separate preliminary operation.

In carrying out the catalytic oxidation, the air and the ammonia are preliminarily mixed in any suitable manner to obtain the necessary degree of intermixture, and to give the proper proportions of air and ammonia, and the mixture is subjected to a preliminary purification, if this is necessary for the purpose of removing impurities. The mixture, which may or may not be preheated, is then passed through the catalytic chamber containing the vanadium oxide catalyst heated to the proper temperature for the catalytic oxidation, for example, heated to from 650° C. to 850° C.

The proportions of ammonia and air can be somewhat varied and the speed of the gases passing through the catalytic chamber can also be varied. There will usually be a proper ratio between the amount of catalyst used and the speed of the gases passing through it which can be readily determined in any particular case. The catalytic process is generally similar to that in which platinum gauze is employed, and the preliminary mixing and supply of the air and ammonia can be effected in a similar manner.

At the outset of the process the vanadium oxide catalyst should be heated to a temperature sufficient to initiate the reaction. After the reaction begins the heat of reaction will to a greater or less extent supply the heat required for maintaining the catalyst at the proper temperature, but this heat can be supplemented or modified to prevent the temperature from rising too high or from falling too low. The temperature will also be affected by the proportion of the reacting gases, and variations in the temperature can be brought about by variations in the proportions or in the richness of the reacting gases.

The gases leaving the catalytic chamber or converter are still at an elevated temperature, and they may be drawn off and cooled in any suitable manner, such as that commonly made use of when platinum is employed as the catalyst. The gases may thus be cooled in a cooler of acid resisting material, and air may then be admixed therewith to oxidize the lower oxides of nitrogen to higher oxides, for example, to oxidize nitric oxide to nitrogen dioxide. The oxides of nitrogen can then be absorbed or otherwise made use of in any suitable manner.

We claim:

1. The method of oxidizing ammonia, comprising subjecting a mixture of ammonia and an oxidizing gas at an elevated temperature to contact with a composite catalyzer formed of vanadium oxide and porous alumina made from alunite.

2. The method of effecting the oxidation of ammonia which comprises bringing a mixture of ammonia and an oxidizing gas into contact with a composite catalyzer made up of vanadium oxide and alumina at an elevated temperature, substantially as described.

In testimony whereof we affix our signatures.

CHARLES H. MacDOWELL.
HERBERT H. MEYERS.
WARREN B. PATTISON.